(12) United States Patent
Sakairi

(10) Patent No.: US 6,215,569 B1
(45) Date of Patent: Apr. 10, 2001

(54) E/O SWITCH CONTROLLING APPARATUS AND METHOD FOR CONTROLLING E/O SWITCH

(75) Inventor: Yoshiyuki Sakairi, Tokyo (JP)

(73) Assignee: Ando Electric Co., Ltd., Tokyo (JP)

( * ) Notice: Subject to any disclaimer, the term of this patent is extended or adjusted under 35 U.S.C. 154(b) by 0 days.

(21) Appl. No.: 09/580,719

(22) Filed: May 30, 2000

(30) Foreign Application Priority Data

Jun. 18, 1999 (JP) .................................................. 11-173030

(51) Int. Cl.$^7$ ..................................................... H04J 14/02

(52) U.S. Cl. .......................................... 359/128; 359/127

(58) Field of Search .................................. 385/2, 6, 8, 12, 385/14, 16; 359/128, 124, 123, 237, 245, 253, 254, 127

(56) References Cited

U.S. PATENT DOCUMENTS 6,101,296 * 8/2000 Tavlykaev et al. ..................... 385/2

* cited by examiner

Primary Examiner—Hung Xuan Dang
(74) Attorney, Agent, or Firm—Fish & Richardson P.C.

(57) ABSTRACT

A switch controlling device supplies, to an E/O switch 2 incorporating LiNbO$_3$, an applied voltage having a prescribed voltage value, a light transmission/interruption control signal 32 of controlling the transmission/interruption of an optical input 2a in the E/O switch 2 and a charging/discharging control signal 33 of controlling exchange between the charging operation and discharging operation for the LiNbO$_3$ crystal in the E/O switch 2. The charging/discharging control signal 33 has a signal having a period of 1 to 20 (inclusive) sec. While the optical output 2a is controlled to be transmitted by the light transmission/interruption control signal 32, the charging/discharging control signal 33 does not instruct exchange between the charging operation and the discharging operation.

8 Claims, 1 Drawing Sheet

1.5 SEC

E/O SWITCH CONTROLLING APPARATUS AND METHOD FOR CONTROLLING E/O SWITCH

BACKGROUND OF THE INVENTION

The present invention relates to an E/O switch controlling apparatus for controlling an E/O switch (electric field optical switch), and more particularly to an E/O switch controlling apparatus and a method for controlling the E/O switch for effectively employing the E/O switch using ferromagnetic crystal such as $LiNbO_3$ in a good polarized state.

One of previously known electro-optical switches is an E/O switch using ferromagnetic crystal such as $LiNbO_3$ crystal. The ferromagnetic crystal used in these E/O switches has a characteristic that refractive index changes according to an applied voltage. The E/O switch using such a characteristic has been employed.

The polarizing characteristic of the E/O switch incorporating the ferromagnetic crystal is improved when charges are accumulated in the ferromagnetic crystal. For this reason, when the E/O switch is used, a voltage for accumulating charges in the ferromagnetic crystal is applied to the ferromagnetic crystal, thereby charging the ferromagnetic crystal.

However, it is known that the polarizing characteristic of the E/O switch is abruptly deteriorated when it is used continuously used for a prescribed time or longer. This is because the charges accumulated in the ferromagnetic crystal exceeds a suitable value when charging for the ferromagnetic crystal is continued.

When the charges accumulated in the ferromagnetic crystal exceed a suitable value, the polarizing characteristic of light incident on the E/O switch is greatly deteriorated so that the insertion loss of the P-wave (parallel polarizing wave) and S-wave (vertical polarizing wave) is increased and crosstalk is increased. In this state, when the operation of the E/O switch is forcibly continued, as the case may be, "offset displacements" that an applied voltage exceeds a prescribed voltage occurred.

Conventionally, the characteristic of the E/O switch was recovered by properly discharging the excessive charges accumulated in the ferromagnetic crystal. Namely, when the E/O switch was continuously used, excess charging was prevented by making exchange between a charging operation of accumulating charges in the ferromagnetic crystal and a discharging operation of discharging the accumulated charges at regular intervals.

However, in the conventional method, alternate exchange between the charging operation and discharging operation requires a certain time while the E/O switch is not operated. This is inferior in time efficiency.

As described above, the ferromagnetic crystal, when charged, falls in a state with good polarizing characteristic. However, the characteristic thereof is greatly deteriorated while it is discharged. Therefore, it was very difficult to adapt the E/O switch to the characteristics of the ferromagnetic crystal during both its charging and discharging. Namely, the E/O switch could not used during the discharging operation.

In the conventional method, it was necessary to make exchange into the discharging operation before the ferromagnetic crystal within the E/O switch is excessively charged. For this purpose, the elapsed time during the charging operation was counted. Further, in order to use the E/O switch in a state with good polarizing characteristic, as the case may be, the discharging operation was made for a longer time than the charging operation. In this case, the using efficiency of the E/O switch was further attenuated.

In order to solve the above problem, the present invention intends to provide an E/O switch controlling apparatus which permits an E/O switch using ferromagnetic crystal to be used efficiently and continuously in a stable state.

SUMMARY OF THE INVENTION

In order to solve the above problem, the invention defined in aspect 1 is an E/O switch controlling apparatus for controlling an E/O switch incorporating ferromagnetic crystal, characterized by comprising clock signal generating means generates a clock signal having a prescribed frequency, and charging/discharging means (switch controlling apparatus 3 producing a charging/discharging controlling signal 33) for making exchange between a charging operation of charging ferromagnetic crystal contained in the E/O switch and a discharging operation of discharging charges in the ferromagnetic crystal in synchronism with a clock signal at a prescribed frequency.

In accordance with the invention defined in aspect 1, in an E/O switch controlling apparatus for controlling an E/O switch incorporating ferromagnetic crystal, the charging/discharging means makes exchange between a charging operation of charging ferromagnetic crystal contained in the E/O switch and a discharging operation of discharging charges in the ferromagnetic crystal in synchronism with a clock signal at a prescribed frequency.

The invention defined in aspect 5 is a method for controlling an E/O switch incorporating ferromagnetic crystal, characterized by comprising the steps of:

generating a clock signal having a prescribed frequency, and making exchange between a charging operation of charging ferromagnetic crystal contained in the E/O switch and a discharging operation of discharging charges in the ferromagnetic crystal in synchronism with a clock signal (e.g. charging/discharging signal 33) at a prescribed frequency.

The ferromagnetic crystal may be $LiNbO_3$ (lithium niobate) $KTaO_3$ (potassium tantalate), $BaTiO_3$ (barium titanate), etc. However, the ferromagnetic crystal is not limited as long as it can be applied to the E/O switch.

Thus, in a E/O switch incorporating ferromagnetic crystal, exchange is made between a charging operation of charging ferromagnetic crystal contained in the E/O switch and a discharging operation of discharging charges in the ferromagnetic crystal in synchronism with a clock signal at a prescribed frequency.

Therefore, the ferromagnetic crystal is not completely shifted into a state of the discharging operation so that the deterioration of the polarizing characteristic and increase in the crosstalk do not occur. Thus, the E/O switch can be used during both the charging operation and the discharging operation so that the E/O switch can be continuously operated.

The invention defined in aspect 2 is an E/O switch controlling apparatus for controlling an E/O switch according to aspect 1, characterized by further comprising light transmission/interruption controlling means (switch controlling apparatus 3 producing a light transmission/interruption controlling signal 3) for switching the light incident on the E/O switch between its transmission and its interruption, and in that the charging/discharging means does not make exchange between the charging operation and discharging operation for the ferromagnetic crystal while the light incident on the E/O switch is produced by controlling the light transmission/interruption controlling means.

In accordance with the invention defined in aspect 2, in an E/O switch controlling apparatus for controlling an E/O switch according to aspect 1, the light transmission/interruption controlling means switches the light incident on the E/O switch between its transmission and its transmission, and the charging/discharging means does not make exchange between the charging operation and discharging operation for the ferromagnetic crystal while the light incident on the E/O switch is produced by controlling the light transmission/interruption controlling means.

The invention defined in aspect 6 is a method for controlling an E/O switch according to aspect 5, characterized by further comprising the step of switching the light incident on the E/O switch between its transmission and its interruption (e.g. operation of producing a light transmission/interruption controlling signal 32 by the switch controlling apparatus 3) and in that exchange is not made between the charging operation and discharging operation for the ferromagnetic crystal while the light incident on the E/O switch is produced by controlling the light transmission/interruption controlling means.

Therefore, it is possible to prevent the light emerging from the E/O switch from being influenced by the deterioration of the polarizing characteristic and increase of the crosstalk of the ferromagnetic crystal which occurs transiently when exchange is made between the charging operation and discharging operation of the ferromagnetic crystal. Thus, the E/O switch can be continuously operated in a stable manner.

The deterioration of the polarizing characteristic and increase of the crosstalk of the ferromagnetic crystal which occur transiently are probably attributable to that in the ferromagnetic crystal, the prescribed voltage which has been applied during the charging operation is not applied.

The invention defined in aspect 3 is a E/O switch controlling apparatus according to aspect 1 or 2, characterized in that the clock signal at the prescribed frequency is a signal with a period of 1 to 20 (inclusive) sec.

In accordance with the invention defined in aspect 3, in an E/O switch controlling apparatus defined in aspect 1 or 2, the clock signal at the prescribed frequency is a signal with a period of 1 to 20 (inclusive) sec.

The invention defined in aspect 6 is a method for controlling an E/O switch according to aspect 4 or 5 characterized in that the clock signal at the prescribed frequency is a signal with a period of 1 to 20 (inclusive) sec.

Therefore, alternate exchange is made between the charging operation and discharging operation in synchronism with the clock signal with a period of 1 to 20 (inclusive) sec. The charging operation and discharging operation are continued for a prescribed time of 0.5 to 10 (inclusive) sec. Thus, the deterioration of the polarizing characteristic of the ferromagnetic crystal occurring when the discharging operation is carried out for a time not shorter than the prescribed time does not occur entirely. This permits the E/O switch to be used effectively in a stable state.

The invention defined in aspect 4 is an E/O switch controlling apparatus according to any one of aspects 1 to 3 characterized in that the E/O switch incorporating lithium niobate (LiNbO$_3$) as ferromagnetic crystal is controlled.

In accordance with the invention defined in aspect 4, in an E/O switch controlling apparatus according to any one of aspects 1 to 3, the E/O switch incorporating lithium niobate (LiNbO$_3$) as ferromagnetic crystal is controlled.

The invention defined in aspect 8 is a method for controlling an E/O switch according to any one of aspects 5 to 7, characterized in that the E/O switch incorporating lithium niobate (LiNbO$_3$) as ferromagnetic crystal is controlled.

Therefore, the E/O switch incorporating lithium niobate (LiNbO$_3$) as ferromagnetic crystal suitable to the E/O switch can be operated continuously and stably.

BRIEF DESCRIPTION OF THE DRAWINGS

FIG. 2A shows the state of the charging/discharging control signal, and FIG. 2B shows the state of a charging /discharging control signal in a conventional E/O switch for reference.

DETAILED DESCRIPTION OF THE PREFERRED EMBODIMENTS

Now referring to FIGS. 1 and 2, an explanation will be given of an mode for carrying out the invention.

Figure 1:
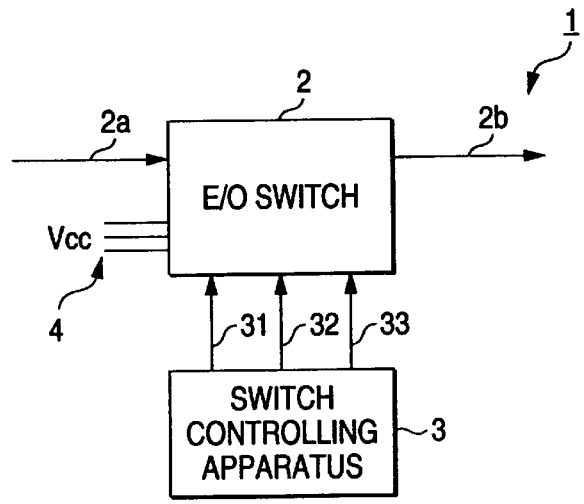
FIG. 1 is a block diagram showing an arrangement of an E/O switch controlling system 1 according to a mode of carrying out the invention.

FIG. 1 is a block diagram showing the arrangement of an E/O switch controlling system 1 according to the mode for carrying out the invention. As seen from FIG. 1, the E/O switch controlling system 1 includes an E/O switch 2 and a switch controlling device for driving/controlling the E/O switch 2.

The E/O switch 2 is an E/O switch which is constructed of LiNbO$_3$ crystal as ferromagnetic crystal. The LiNbO$_3$ crystal has a characteristic that its refractive index changes according to an applied voltage. Using this characteristic, the E/O switch 2 makes switching of an optical input 2$a$ according to an light transmission/interruption control signal 32 described later and produces a pulsating optical output 2$b$. The E/O switch 2 is supplied with a power supply voltage 4 as a power source, and also supplied with an applied voltage 31, a light transmission/interruption signal 32 and a charging/discharging controlling signal 33.

The switch controlling device 3 is a control device for driving/controlling the E/O switch 2 sends the applied voltage 31, light transmission/interruption signal 32 and charging/discharging controlling signal 33 to the E/O switch 2.

The applied voltage 31 is a voltage which is applied to control the refractive index of the LiNbO$_3$ crystal in the E/O switch 2 when the E/O switch 2 is operated. The value of the applied voltage can be set optionally according to the use of the E/O switch and the characteristic of the appliance connected to the E/O switch 2.

The light transmission/interruption signal 32, which is an ECL (Emitter Coupled Logic) signal in this example, controls the transmission and interruption of light in the E/O switch 2 to control whether or not the optical output 2$b$ should be produced.

The light transmission/interruption signal 32 is produced to provide a signal level of an "Hi" level instructing the interruption of light or a "Lo" level instructing the transmission of light.

The charging/discharging control signal 33, which is a TTL (Transistor Transistor Logic) signal in this example, is a signal for instructing exchange between the charging operation and discharging operation in the E/O switch. For example, the signal having the signal level of the "Hi" level instructing the charging operation or the "Lo" level instructing the discharging operation is produced.

An explanation will be given of the operation of the E/O switch controlling system.

When the power supply voltage 4 is applied to the E/O switch 2 and the optical input 2a is supplied thereto, the optical output 2b is produced from the E/O switch 2 while transmission of light is instructed by the light transmission/interruption control signal 32. In this case, the refractive index of the LiNbO$_3$ is determined according to the value of the applied voltage.

For example, assuming that the light transmission/interruption control signal 32 has a pulse width of 1 µs (micro seconds) and the "H" level : "Lo" level=2000:1, during 1 µs for each ⅕₀₀ sec., the E/O switch transmits light to produce the optical output 2b.

The E/O switch 2 exhibits a good polarizing characteristic in a state where charges have been accumulated in the LiNbO$_3$ crystal. Therefore, while the E/O switch 2 is used, the LiNbO$_3$ is charged. However, when the charges accumulated in the LiNbO$_3$ exceed a preferable amount as a result that the charging or the LiNbO$_3$ has been carried out for a long time, the polarizing haracteristic of the light incident on the E/O switch is emarkably deteriorated. Thus, the insertion loss of the P-wave (parallel polarizing wave) and S-wave (vertical polarizing wave) is increased and crosstalk is increased. In this state, when the operation of the E/O switch is forcibly continued, as the case may be, "offset displacement" that an applying voltage exceeds a prescribed voltage may occur, thereby leading to failure of the E/O switch 2. Thus, the charging/discharging control signal 33 is exchanged from the "Hi" level to the "Lo" level so that the LiNbO$_3$ is discharged.

Conventionally, while the LiNbO$_3$ crystal is discharged, the polarizing characteristic of the E/O switch 2 is deteriorated so that the optical output 2b was not produced. However, in the E/O switch controlling system 1 according to the present invention, as described below, the charging/discharging control signal 33 is exchanged at a high speed so that the E/O switch 2 can be used continuously during both charging operation and discharging operation.

Figure 2A:
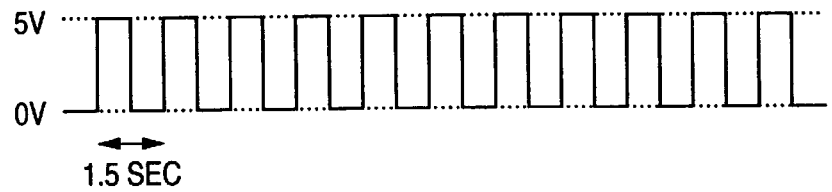
FIGS. 2A and 2B are timing chart of the state of a charging/discharging control signal 33 in FIG. 1.
Figure 2B:
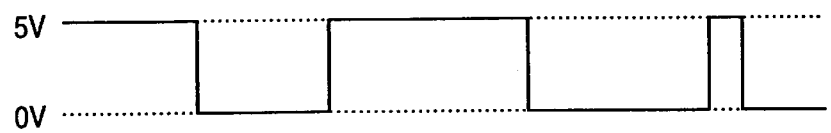

FIGS. 2A and 2B are timing chart showing an example of the charging/discharging controlling signal 33 in the E/O switch controlling system 1. In FIG. 2A shows an example of the charging/discharging controlling signal, i.e. a case where the "Hi" level is 5 V and the "Lo" level is 0 V, and FIG. 2B shows the state of the charging/discharging controlling signal in a conventional E/O switch for information. Incidentally, the charging/discharging controlling signal in FIGS. 2A and 2B instructs the charging operation at the "Hi" level of 5 V and the discharging operation at the "Lo" level of 0 V.

In the example showing in FIG. 2A, the charging/discharging controlling signal 33 is produced in such a manner that it is exchanged between the "Hi" level of 5 V and the "Lo" level of 0 V. This exchanging is made at a period of 1.5 sec. The duty ratio between the "Hi" level and the "Lo" level is 50:50. Therefore, the charging/discharging controlling signal 33 is produced at the "Hi" level for 0.75 sec., and thereafter at the "Lo" level for 0.75 sec.

When the charging/discharging controlling signal 33 as shown in FIG. 2A is supplied to the E/O switch 2, the polarizing characteristic is not deteriorated so greatly for the discharging operation so that the optical output 2b can be produced from the E/O switch 2.

Namely, by making exchange between the charging operation and the discharging operation in the E/O switch 2 at a high speed, after the operation is exchanged into the discharging operation, unlike during the discharging operation in the prior art, the phenomenon of deterioration of the polarizing characteristic and increase of crosstalk does not occur.

This is probably because the duty ratio of the charging/discharging controlling signal 33 is 50:50 and exchange between the charging operation and the discharging operation is made at a high speed so that the LiNbO$_3$ crystal is in a state where the LiNbO$_3$ crystal does not apply to both the charging operation state and the discharging operation state. This phenomenon is remarkable when exchange between the charging operation and discharging operation is made at a higher speed as compared to the time required for the LiNbO$_3$ crystal to be entirely shifted from the charging operation state to the discharging operation state.

The exchange between the charging operation and the discharging operation is made at the high speed with a short period using the charging/discharging operation so that E/O switch 2 can be used during the discharging operation. Therefore, the E/O switch can be continuously operation without stopping its operation for discharging.

The charging/discharging control signal 33 shown in FIG. 2A has a duty ratio of 50:50. However, the duty ratio should not be limited to it. Even when the duty ratio of the charging/discharging control signal 33 is 40:60 with a slightly longer discharging operation, the same effect can be obtained. The discharging operation may be carried out for a further longer time.

Meanwhile, when the E/O switch 2 is exchanged from the charging operation to the discharging operation, for a slight time after the exchanging operation, the phenomenon that its polarizing characteristic is deteriorated and the crosstalk is increased occurs.

More specifically, when the E/O switch 2 is exchanged from the charging operation to the discharging operation, for 5 ms (milli second) after the exchanging operation, the phenomenon that the polarizing characteristic is deteriorated and the crosstalk is increased occurs. This phenomenon is probably attributable to that the voltage which has been applied during the charging operation changes abruptly. When the transient phenomenon occurs, the optical output 2b which does not satisfy the required operation is produced irrespectively of that light being interrupted.

Therefore, the switch controlling device 3 operates so as not to exchange the E/O switch from the charging operation to the discharging operation by the charging/discharging operation while transmission of light through the E/O switch is instructed by the light transmission/interruption signal 32. Thus, the optical output 2b which is being produced by the essential operation becomes immune to the crosstalk by the above transient phenomenon.

More specifically, in a state where the light transmission/interruption control signal 32 supplied from the switch control device 3 to the E/O switch 2 is at the "Lo" level and the optical output 2b is produced, when the charging/discharging state is exchanged from the "Hi" level to the "Lo" level, the optical output 2b is influenced by the deterioration of the polarizing characteristic and increase in the crosstalk which occur transiently. Therefore, only while the light transmission/interruption control signal 32 from the switching control device 3 is at the "Hi" level and the light from the E/O switch 2 is interrupted, the charging/discharging control signal 33 can be exchanged between the "Hi" level and the "Lo" level. Thus, while the optical output 2b is produced, exchange is not made between the charging operation and the discharging operation so that the deterioration of the optical output 2b due to the above transient phenomenon does not occur.

The light transmission/interruption control signal 32 is a signal which is produced with the "Hi" level "Lo" level= 2000:1 at a period of about 1 $\mu$s. Therefore, the influence due to incapability of exchange of the charging/discharging control signal 33 during the "Lo" level of the light transmission/interruption control signal 32 is slight.

In the example of FIG. 2A, the period of exchanging the output of the charging/discharging control signal 33 was 1.5 sec.

However, it is preferred that the period of exchange of the charging/discharging signal 33 is not shorter than 1 sec. and not longer than 20 sec.

This is based on the following reason. In order to avoid the influence for the optical output 2b by the transient phenomenon due to exchange of the charging/discharging signal 33, the period is preferably 1 sec. or longer. On the other hand, if the exchange period of the charging/discharging signal 33 exceeds 20 sec., the LiNbO$_3$ in the E/O switch 2 is completely shifted into the state during discharging operation. Therefore, as the case may be, the polarizing characteristic of the E/O switch 2 during the discharging operation may be deteriorated remarkably.

The period of exchanging the output of the charging/discharging control signal 33 is more preferably not shorter than 1.5 sec. and not longer than 10 sec. This is because the above transient phenomenon and the deterioration of the polarizing characteristic during the discharging operation and increase of the crosstalk during the discharging operation of the E/O switch 2 can be avoided. The most preferable period of exchange for continuous use is 1.5 sec.

As described above, by driving/controlling the E/O switch 2 through the switch control device 3, the optical output 2b which is pulsating can be obtained from the E/O switch 2. The optical output 2b is converted into an electrical signal by a photoelectric converter. By observing the electric signal on an oscilloscope, the crosstalk in the E/O switch 2 can be measured.

Further, the optical output transmitted through a polarizer which transmits either one of the P-wave (parallel polarized wave) and S-wave (vertical polarized wave) is observed by an optical power meter. Thus, the polarizing characteristic of the E/O switch 2 can be measured.

As understood from the description made hitherto, the E/O switch control system 1 according to an embodiment of the present invention is composed of an E/O switch 2 and switch control device 3 for driving/controlling the E/O switch 2. In addition, the E/O switch 2 is supplied, from the switch control device 3, with the applied voltage 31 for charging the LiNbO$_3$ in the switch body 2, light transmission/interruption control signal 32 for instructing the exchange between transmission and interruption of light and the charging/discharging control signal 33 for instructing exchange between the charging operation and discharging operation.

The charging/discharging control signal 33 is e.g a square wave with a period of 1.5 sec. This charging/discharging control signal permits the E/O switch 2 to be exchanged at a high speed with the same period. Therefore, the E/O switch 2 can be continuously used to produce the optical output 2b.

Unlike the conventional E/O switch, it is not necessary to count the time elapsed during the charging operation. Therefore, the apparatus configuration can be simplified so that miniaturization and cost reduction of the apparatus can be realized.

Further, the switch control device 3 does not make exchange from the charging operation to the discharging operation by the charging/discharging operation 33 while the light transmission/interruption control signal 32 instructs the optical output 2b to be produced. Therefore, the optical output 2b to be essentially produced is not seriously affected by the transient deterioration of the polarizing characteristic and increase of the crosstalk which occur in the E/O switch 2.

Incidentally, in the E/O switch control system 1 in the above mode for carrying out the invention, the applied voltage 31, light transmission/interruption signal 32 and charging/discharging control signal 33 are generated from the switch control device 3. However, the present invention should not be limited to such a manner. For example, a plurality of individual devices for generating the applied voltage 31, light transmission/interruption control signal 32 and the charging/discharging signal 33, respectively may be provided.

Further, the value of the applied voltage 31 and the period of making exchange between transmission and interruption of the optical output 2a using the light transmission/interruption control signal 32 may be changed as occasion demands according to the use of the E/O switch 2.

The E/O switch 2 according to the mode carrying out the invention incorporates LiNbO$_3$ (lithium niobate) as ferromagnetic material. However, the present invention should not be limited to this material. The E/O switch 2 may incorporate KTaO$_3$ (potassium tantalate), BaTiO$_3$ (barium titanate), TaNbO$_3$ (tantalum niobate) which are a ferromagnetic material applicable to an E/O switch (electric optical switch).

In accordance with the E/O switch controlling apparatus defined in aspect 1 and the E/O switch controlling method defined in aspect 5, in a E/O switch incorporating ferromagnetic crystal, exchange is made between a charging operation of charging ferromagnetic crystal contained in the E/O switch and a discharging operation of discharging charges in the ferromagnetic crystal in synchronism with a clock signal at a prescribed frequency. Therefore, the ferromagnetic crystal is not completely shifted into a state of the discharging operation so that the deterioration of the polarizing characteristic and increase in the crosstalk do not occur. Thus, the E/O switch can be used during both the charging operation and the discharging operation so that the E/O switch can be continuously operated.

In accordance with the E/O switch control apparatus defined in aspect 2 and the E/O switch controlling method defined in aspect 6, it is possible to prevent the light emerging from the E/O switch from being influenced by the deterioration of the polarizing characteristic and increase of the crosstalk of the ferromagnetic crystal which occurs transiently when exchange is made between the charging operation and discharging operation of the ferromagnetic crystal. Thus, the E/O switch can be continuously operated in a stable manner.

In accordance with the E/O switch control apparatus defined in aspect 3 and E/O switch controlling method defined in aspect 7, alternate exchange is made between the charging operation and discharging operation in synchronism with the clock signal with a period of 1 to 20 (inclusive) sec. The charging operation and discharging operation are continued for a prescribed time of 0.5 to 10 (inclusive) sec. Thus, the deterioration of the polarizing characteristic of the ferromagnetic crystal occurring when the discharging operation is carried out for a time not shorter than the prescribed time does not occur entirely. This permits the E/O switch to be continuously operated effectively and stably.

In accordance with the E/O switch controlling apparatus defined in aspect 4 and the E/O switch controlling method defined in aspect 8, the E/O switch incorporating lithium niobate (LiNbO$_3$) as ferromagnetic crystal suitable to the E/O switch can be continuously operated in a stable manner.

What is claimed is:

1. An E/O switch controlling apparatus for controlling an E/O switch incorporating ferromagnetic crystal, comprising:

clock signal generating means for generating a clock signal having a prescribed frequency, and charging/discharging means for exchanging said E/O switch between a charging operation of charging ferromagnetic crystal contained in said E/O switch and a discharging operation of discharging charges in the ferromagnetic crystal in synchronism with a clock signal at the prescribed frequency.

2. The E/O switch controlling apparatus for controlling an E/O switch according to claim 1, further comprising:

light transmission/interruption controlling means for switching the light incident on said E/O switch between transmission and interruption, wherein said charging/discharging means is prohibited to make exchange between the charging operation and the discharging operation for the ferromagnetic crystal while the light incident on said E/O switch is produced by controlling said light transmission/interruption controlling means.

3. The E/O switch controlling apparatus according to claim 1, wherein said clock signal at the prescribed frequency is a signal with a period of 1 to 20 sec.

4. The E/O switch controlling apparatus according to claim 1, wherein said E/O switch incorporating lithium niobate (LiNbO$_3$) as ferromagnetic crystal is controlled.

5. A method for controlling an E/O switch incorporating ferromagnetic crystal, comprising the steps of:

generating a clock signal having a prescribed frequency, and making exchange between a charging operation of charging ferromagnetic crystal contained in said E/O switch and a discharging operation of discharging charges in the ferromagnetic crystal in synchronism with a clock signal at the prescribed frequency.

6. The method for controlling an E/O switch according to claim 5, further comprising:

switching the light incident on the E/O switch between its transmission and its interruption, wherein exchange is prohibited to make between the charging operation and the discharging operation for the ferromagnetic crystal while the light incident on said E/O switch is produced by controlling said light transmission/interruption controlling means.

7. The method for controlling an E/O switch according to claim 5, wherein said clock signal at the prescribed frequency is a signal with a period of 1 to 20 sec.

8. The method for controlling an E/O switch according to claim 5, wherein said E/O switch incorporating lithium niobate (LiNbO$_3$) as ferromagnetic crystal is controlled.

* * * * *